United States Patent [19]

Kerschner et al.

[11] Patent Number: 5,723,859
[45] Date of Patent: Mar. 3, 1998

[54] LINE CONTACT HAND-HELD SCANNING DEVICE AND METHOD HAVING A LIGHT PATH SUBSTANTIALLY PERPENDICULAR TO THE ORIENTATION OF THE OBJECT AT A LINE PORTION

[75] Inventors: Ronald K. Kerschner, Loveland; Charles H. McConica; Jacklyn M. Dowdy, both of Fort Collins; David K. Campbell, Loveland, all of Colo.

[73] Assignee: Hewlett-Packard Company, Palo Alto, Calif.

[21] Appl. No.: 601,276

[22] Filed: Jan. 29, 1996

[51] Int. Cl.⁶ .................................................. H01J 3/14
[52] U.S. Cl. .......................... 250/234; 250/556; 358/473; 235/472; 382/313
[58] Field of Search ........................ 250/234, 556, 250/566, 208.1; 358/473–474; 382/313, 316; 235/472, 462

[56] References Cited

U.S. PATENT DOCUMENTS

| | | | |
|---|---|---|---|
| 4,703,186 | 10/1987 | Kakayama et al. | 250/566 |
| 4,709,144 | 11/1987 | Vincent | 250/226 |
| 4,819,083 | 4/1989 | Kawai et al. | |
| 4,870,268 | 9/1989 | Vincent et al. | 250/226 |
| 4,894,523 | 1/1990 | Chadima, Jr. et al. | 235/472 |
| 4,899,228 | 2/1990 | Sano et al. | 358/473 |
| 4,926,041 | 5/1990 | Boyd | 250/226 |
| 4,967,188 | 10/1990 | Collins, Jr. | 235/462 |
| 4,969,054 | 11/1990 | Tsuji et al. | 358/473 |
| 5,019,703 | 5/1991 | Boyd et al. | 250/208.1 |
| 5,032,004 | 7/1991 | Steinle | 250/226 |
| 5,038,028 | 8/1991 | Boyd et al. | 250/208.1 |
| 5,044,727 | 9/1991 | Steinle | 250/226 |
| 5,182,450 | 1/1993 | Pan | 250/234 |
| 5,227,620 | 7/1993 | Elder, Jr. et al. | 250/226 |
| 5,301,243 | 4/1994 | Olschafskie et al. | 358/473 |
| 5,306,908 | 4/1994 | McConica et al. | 250/234 |
| 5,381,020 | 1/1995 | Kochis et al. | 250/566 |
| 5,404,872 | 4/1995 | Steinle . | |
| 5,410,347 | 4/1995 | Steinle et al. . | |
| 5,434,680 | 7/1995 | Noda et al. . | |

FOREIGN PATENT DOCUMENTS

| | | |
|---|---|---|
| 168 256 | 1/1986 | European Pat. Off. . |
| 270 686 | 6/1988 | European Pat. Off. . |
| WO-A-88 01123 | 2/1988 | WIPO . |

OTHER PUBLICATIONS

Vol. 12 No. 256, Jul. 19, 1988, Patent Abstracts of Japan, re JP–A–63 042 275, Feb. 23, 1998, Mitsubishi Electric Corp.
Vol. 17, No. 152, Mar. 23, 1993, Patent Abstracts of Japan, re JP–A–04 319 857 Nov. 10, 1992, Canon, Inc.

Primary Examiner—Que Le

[57] ABSTRACT

The present invention is directed to a hand-held scanning device which contacts an object to be scanned only at substantially colinear points, e.g., via a roller. This configuration allows the scanning device to scan very close to the edge of an object to be scanned while remaining fully supported by the object. In order to counteract detrimental effects caused by tilting of the scanning device during a scan, the scan region of the scanning device is located close to the roller, a relatively high f-number lens is used and a widened illumination area is employed. The scanning device is also configured to provide for easy grasping by a user and to allow the user to view the scan region during a scan.

26 Claims, 13 Drawing Sheets

LINE CONTACT HAND-HELD SCANNING DEVICE AND METHOD HAVING A LIGHT PATH SUBSTANTIALLY PERPENDICULAR TO THE ORIENTATION OF THE OBJECT AT A LINE PORTION

FIELD OF THE INVENTION

The present invention relates generally to optical scanners and, more particularly, to a hand-held optical scanner that is supported on a scanned object in a substantially line contact fashion while a scan is being performed.

BACKGROUND OF THE INVENTION

Optical scanners are well-known in the art and produce machine-readable data which is representative of the image of an object, e.g. a page of printed text. Optical scanners generally employ line-focus systems which image an object by sequentially focusing narrow "scan line" portions of the object onto a linear photosensor array by sweeping a scanning head over the object.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto photosensor arrays. Some color optical scanners employ beam splitter devices for spectrally separating an imaging light beam into color component beams. These separate color component beams are projected onto separate linear photosensor arrays. Other optical scanners project color component images on a single linear array in a series of separate scanning passes.

The construction and operation of color optical scanners employing beam splitter assemblies and photosensor arrays are disclosed in the following United States Patents: U.S. Pat. No. 5,410,347 of Steinle et al. for COLOR OPTICAL SCANNER WITH IMAGE REGISTRATION HOLDING ASSEMBLY; U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent application No. 90306876.5 filed Jun. 22, 1990); U.S. Pat. No. 5,019,703 of Boyd et al. for OPTICAL SCANNER WITH MIRROR MOUNTED OCCLUDING APERTURE OR FILTER (and corresponding EPO patent application No. 90312893.2 filed Nov. 27, 1990); U.S. Pat. No. 5,032,004 of Steinle for BEAM SPLITTER APPARATUS WITH ADJUSTABLE IMAGE FOCUS AND REGISTRATION (and corresponding EPO patent application No. 91304185.1 filed May 9, 1991); U.S. Pat. No. 5,044,727 of Steinle for BEAM SPLITTER/COMBINER APPARATUS (and corresponding EPO patent application No. 91303860.3 filed Apr. 29, 1991); U.S. Pat. No. 5,040,872 of Steinle for BEAM SPLITTER/COMBINER WITH PATH LENGTH COMPENSATOR (and corresponding EPO patent application No. 90124279.2 filed Dec. 14,1990 which has been abandoned); and U.S. Pat. No. 5,227,620 of Elder, Jr. et al. for APPARATUS FOR ASSEMBLING COMPONENTS OF COLOR OPTICAL SCANNERS (and corresponding EPO patent application No. 91304403.8 filed May 16, 1991), which are all hereby specifically incorporated by reference for all that is disclosed therein.

A hand-held optical scanning device is an optical scanner which is moved across a scanned object, e.g. a page of text, by hand. Optical systems for hand-held scanning devices must generally be very compact due to the relatively small size of hand-held scanning devices.

Most hand-held optical scanning devices employ optical systems which fold the light path in a substantially horizontal orientation (i.e. parallel to the plane of the object being scanned). This results in the housing of such a scanning device having a horizontal dimension that is greater than its vertical dimension. It has been found that this generally flat shaped housing is difficult to grasp by users of the scanning device.

Rollers may be provided on a hand-held scanning device to guide the device across the object to be scanned and also to provide data to the scanning device microprocessor regarding the speed at which the scanning device is being moved over the scanned object. These rollers may also serve to control the speed at which an operator moves the scanning device across the scanned object.

The construction and operation of hand-held optical scanning devices employing such rollers is disclosed in the following United States patents: U.S. Pat. No. 5,381,020 of Kochis et al. for HAND-HELD OPTICAL SCANNER WITH ONBOARD BATTERY RECHARGING ASSEMBLY and U.S. Pat. No. 5,306,908 of McConica et al. for MANUALLY OPERATED HAND-HELD OPTICAL SCANNER WITH TACTILE SPEED CONTROL ASSEMBLY (and corresponding EPO patent application No. 94301507.3 filed Mar.2, 1994), which are all hereby specifically incorporated by reference for all that is disclosed therein.

Most hand-held scanning devices employ at least two longitudinally spaced rollers or sets of rollers. Generally, these rollers rotate about axes which are perpendicular to the direction in which the scanning device is moved during a scanning operation. Such scanning devices typically scan a portion of the document which is located between the two rollers. The use of two rollers maintains the optics of the scanning device at a fixed distance from the object being scanned and prevents the scanning device from tilting forward or backward during use.

The use of two rollers, however, causes problems when scanning many documents (e.g., a page of printed text). In order to ensure that a two-roller scanning device captures all of the desired image (e.g., text) during a scanning operation, it is necessary to move a two-roller scanning device to a position substantially beyond the edge of the text. When the text is located close to the top or bottom of the document, this often results in one of the rollers rolling off of the document.

This represents a particular problem when scanning a page from a book, for example, since the page being scanned may not be level with the surrounding supporting surface. In such a situation, the user of a two-roller hand-held scanning device must attempt to hold the scanning device level without the assistance of one of the rollers when scanning the region near the edge of the page.

This problem is compounded due to the fact that the user cannot see exactly what portion of the document is being scanned. In most two roller scanners, this area is hidden by the body of the scanner itself.

Some hand-held scanning devices have only one roller and provide a support surface spaced from this roller which slides across the object to be scanned in order to maintain the optics of the scanning device at a fixed distance from the object and prevent tilting. This type of scanning device, however, suffers from the same disadvantages discussed above.

Thus, it would be generally desirable to provide an apparatus which overcomes these problems associated with hand-held optical scanning devices.

SUMMARY OF THE INVENTION

The present invention is directed to a hand-held scanning device which is constructed to maintain only a line contact with a scanned object during a scan. This line contact may be provided by a single roller or by multiple rollers having colinear axes. The scan line region is located wary close to the roller or rollers. In this manner, the hand-held scanning device of the present invention will remain supported on the object to be scanned at all times that a scan is being performed.

Also, because of this unique configuration, the area being scanned by the scanning device is visible to the user while a scan is being performed. This allows the user to determine exactly what is being scanned while performing a scan with the device.

Because only line support is provided, the scanning device is able to rotate or tilt about the axis of the roller or rollers. This tilting causes the scanning device optics to move closer to and further away from the object. To compensate for this movement, the scanning device is equipped with a relatively high f-number lens. This lens provides a relatively large depth of field which allows the object to stay in focus even while the scanning device is tilting.

An illumination source is also provided which generates a relatively wide illumination area on the scanned object to ensure that the scan line region will be illuminated even when the scanning device is tilting.

The present invention is also directed to a hand-held scanning device which is configured such that its vertical dimension exceeds its horizontal dimension, thus making it easy to grasp by a user during a scanning operation. This is accomplished by arranging the light path of the hand-held scanning device in a vertical orientation, rather than a horizontal orientation.

DETAILED DESCRIPTION OF THE INVENTION

FIGS. 1–14, in general, illustrate a hand-held optical scanning device 10 for imaging a scanned object 54. The scanner includes a housing 20 containing an imaging assembly 40. The housing 20 is tiltable relative to the scanned object 54 while a scan is being performed with the scanning device 10.

Also illustrated is a method of scanning an object 54 with a hand-held optical scanning device 10. The method includes the steps of making contact between the object 54 and the scanning device 10; performing a scan while moving the scanning device 10 along the object 54 and maintaining contact; and tilting the scanning device 10 while performing the scan.

Having thus described the hand-held scanning device in general, the device will now be described in further detail.

Figure 1:
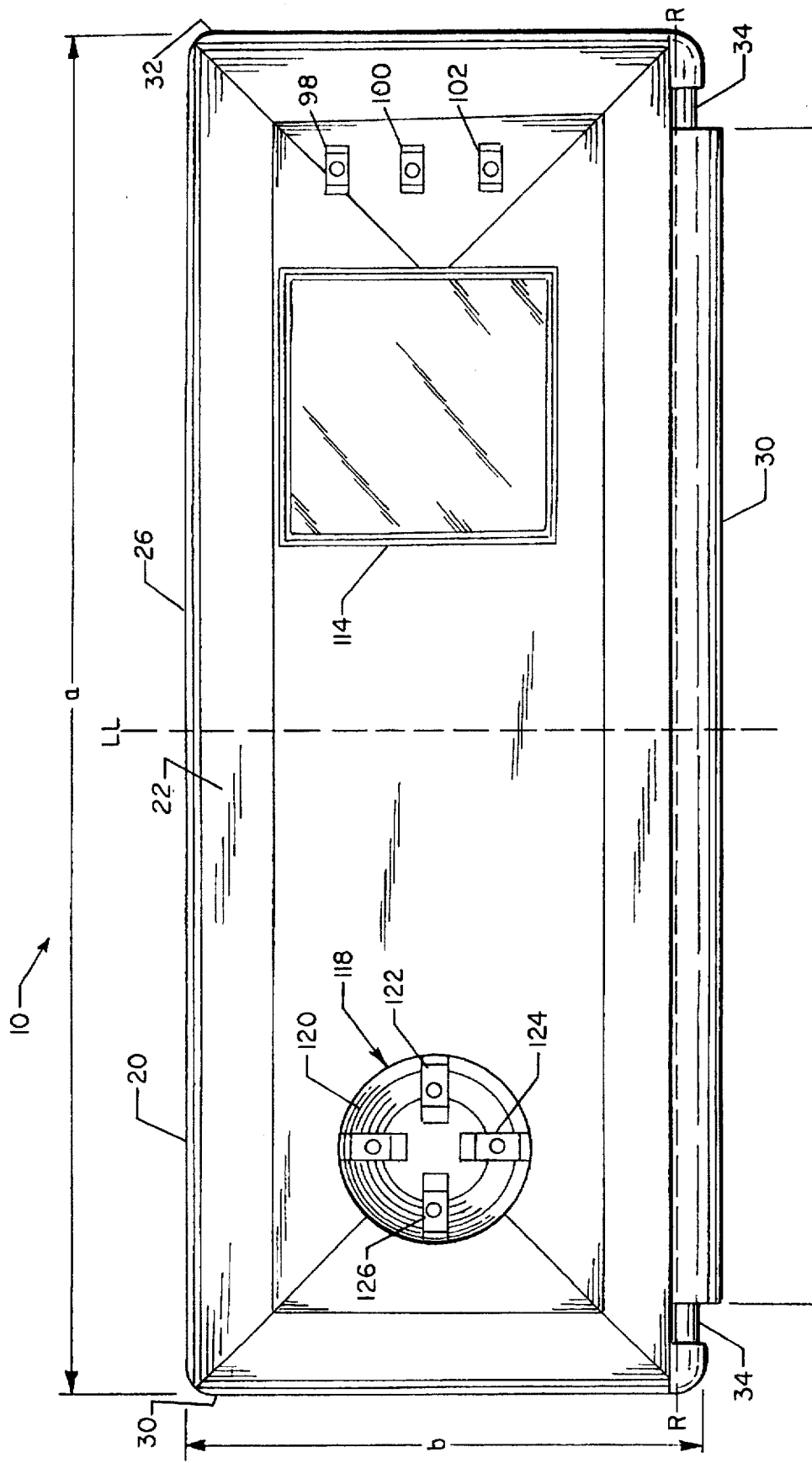
FIG. 1 is a front elevation view of a hand-held scanning device.

FIG. 1 illustrates a hand-held scanning device 10. The scanning device 10 includes a housing 20 which may be a generally parallelepiped-shaped member having a generally flat front surface 22, a generally flat rear surface 24, FIG. 2, a generally flat top surface 26, FIG. 3; a generally flat bottom surface 28, and generally flat opposite end surfaces 30, 32, FIG. 1. The scanning device 10 has a central axis LL, FIGS. 1, 3, 4, and 7–11.

It is to be understood that terms such as "front", "rear", "top", "bottom", "horizontal" and "vertical" are used herein for illustration purposes only. In actual use, the scanning device 10 can be used in almost any orientation, thus making terms such as "front", "rear", "top", "bottom", "horizontal" and "vertical" relative to the orientation of the scanning device.

Figure 3:
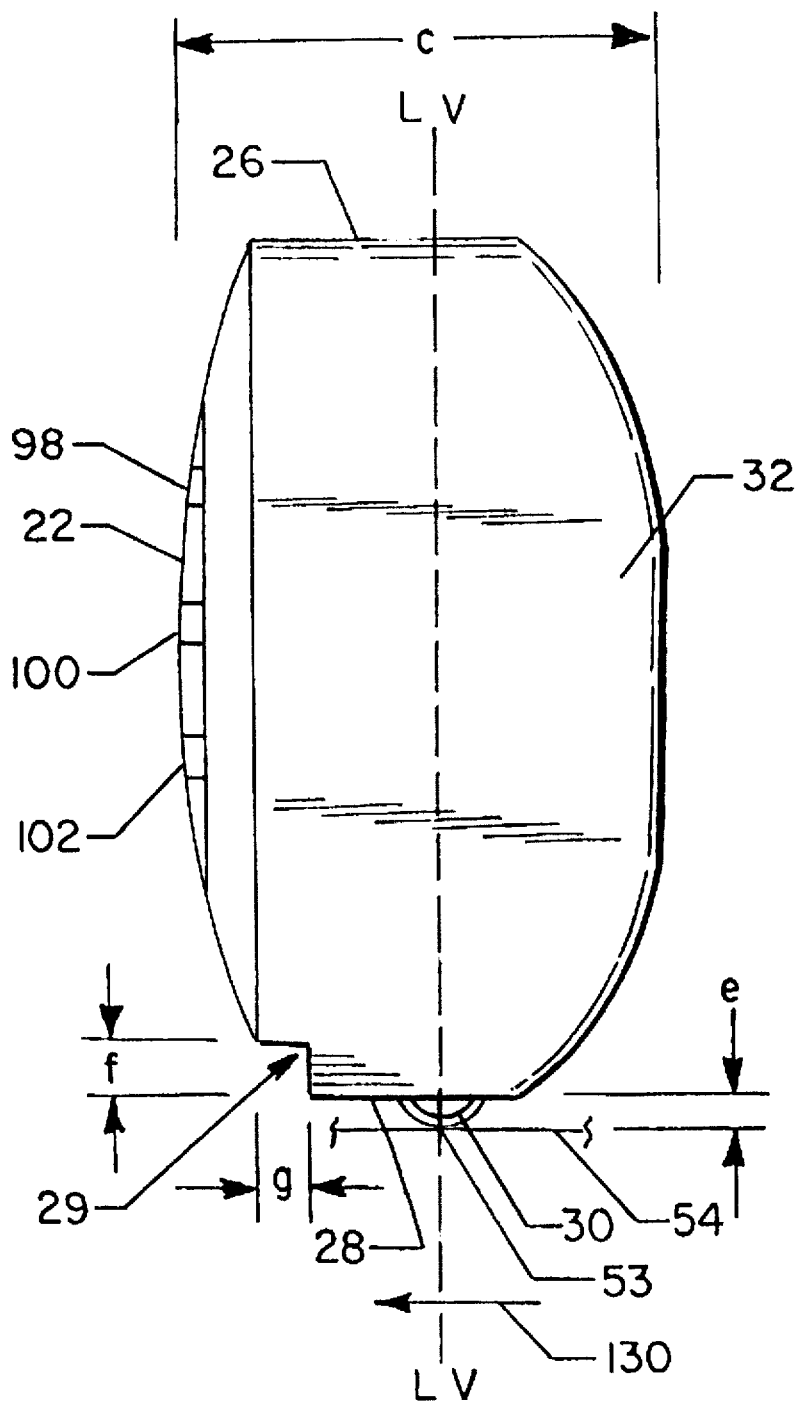
FIG. 3 is a side elevation view of the hand-held scanning device of FIG. 1.

Housing 20 may have a length "a" of, e.g., 9.5 inches, FIG. 1; a height "b" of, e.g., 3.75 inches, and a depth "c" of, e.g., 1.75 inches, FIG. 3.

Figure 4:
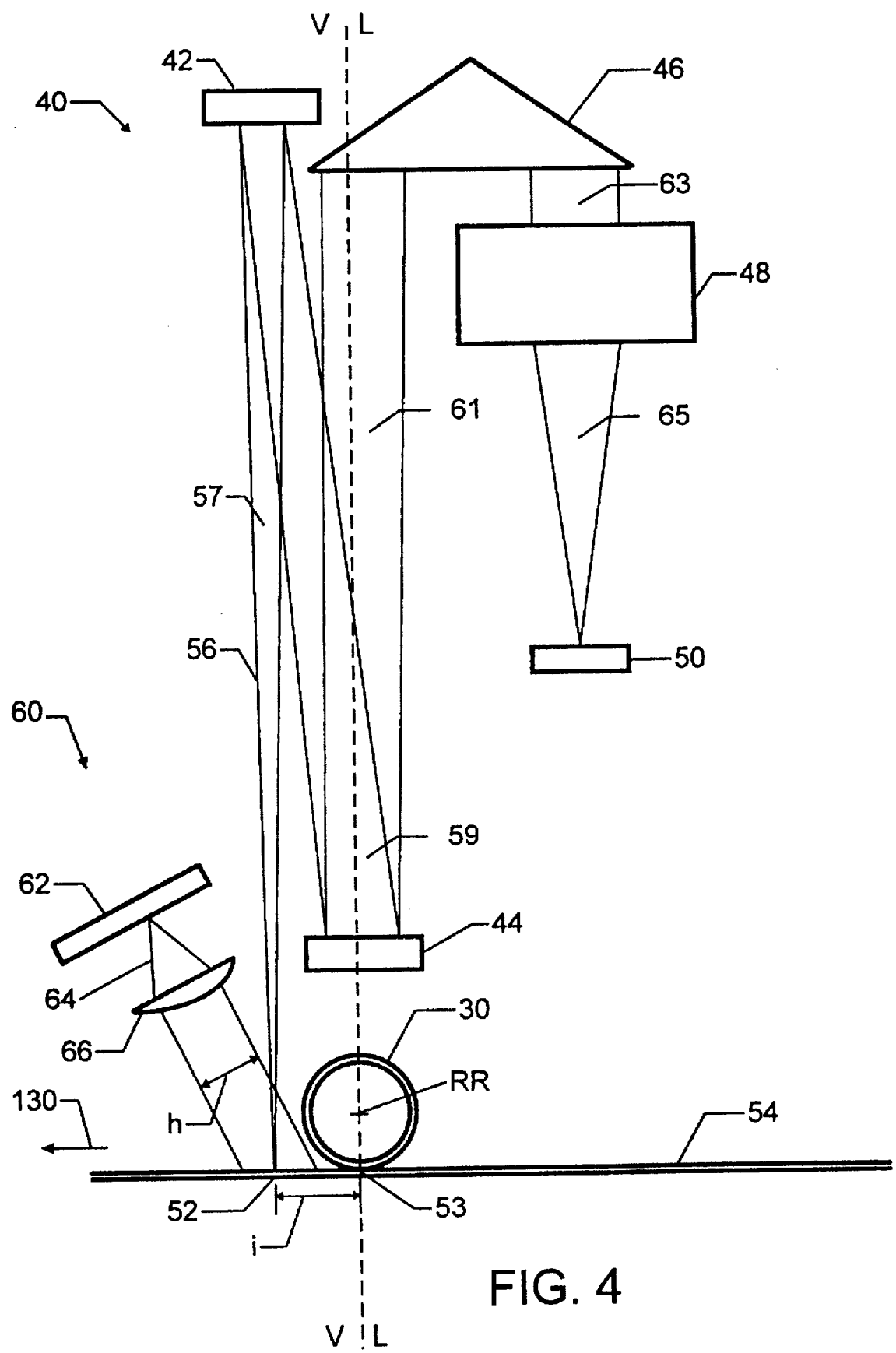
FIG. 4 is a schematic side elevation view of the optical system of the hand-held scanning device of FIG. 1.

Housing 20 contains an imaging assembly 40 as shown schematically in FIG. 4. Imaging assembly 40 may contain mirrors 42 and 44, a prism 46, and an imaging lens 48. These optical components fold and resize the image beam 56 and serve to focus a line portion 52 of a scanned object 54 onto a photosensor array 50 in a manner that is well-known in the art. A data signal 82, representative of scanned line images, is transmitted by photosensor array 50 to a microprocessor 80 which is located in housing 20, FIG. 5. Imaging assembly 40 may be either a monochrome or a color imaging assembly as is well known in the art.

A light source 60 is also provided in housing 20 as shown in FIG. 4. The light source 60 may include an LED (light emitting diode) board 62. LED board 62 generates light 64, in a well-known manner, approximately along the length "d" of the housing 20, FIG. 1. The light 64 is directed through a lens 66, FIG. 4, and then onto the scanned object 54. In this manner, the line portion 52 of the scanned object 54 is illuminated in order to allow image beam 56 to be generated.

Imaging assembly 40 may be configured in a vertical orientation (i.e., transverse to the plane of the scanned object 54) as shown in FIG. 4. The configuration of the mirrors 42 and 44, the prism 46 and the photosensor array 50 cause the imaging light beam 56 to be folded into a plurality of substantially vertically extending portions 57, 59, 61, 63, 65 rather than horizontally extending portions. The length of portion 57 may be about 80 mm; the length of portion 59 may be about 59 mm; the length of portion 61 may be about 54 mm; the length of portion 63 may be about 3 mm; and the length of portion 65 may be about 20 mm. The length of the light beam within the prism 46 may be about 18 mm and the length of the light beam within the lens 48 may be about 6 mm. The lengths described above result in the overall length of imaging light beam 56 being approximately 240 mm. Due to the configuration described above, at least 80% of the light path 56 will extend in a substantially vertical direction, i.e. a direction perpendicular to the object 54 at the location of the line portion 54.

This arrangement causes the height "b", FIG. 1 of the scanning device housing to be greater than its depth "c", FIG. 3. It has been found that this configuration of the housing allows easy grasping by a human hand and thus facilitates ease of use during a scanning operation. In a preferred embodiment, the housing height "b" may be at least about twice the housing depth "c".

Figure 5:
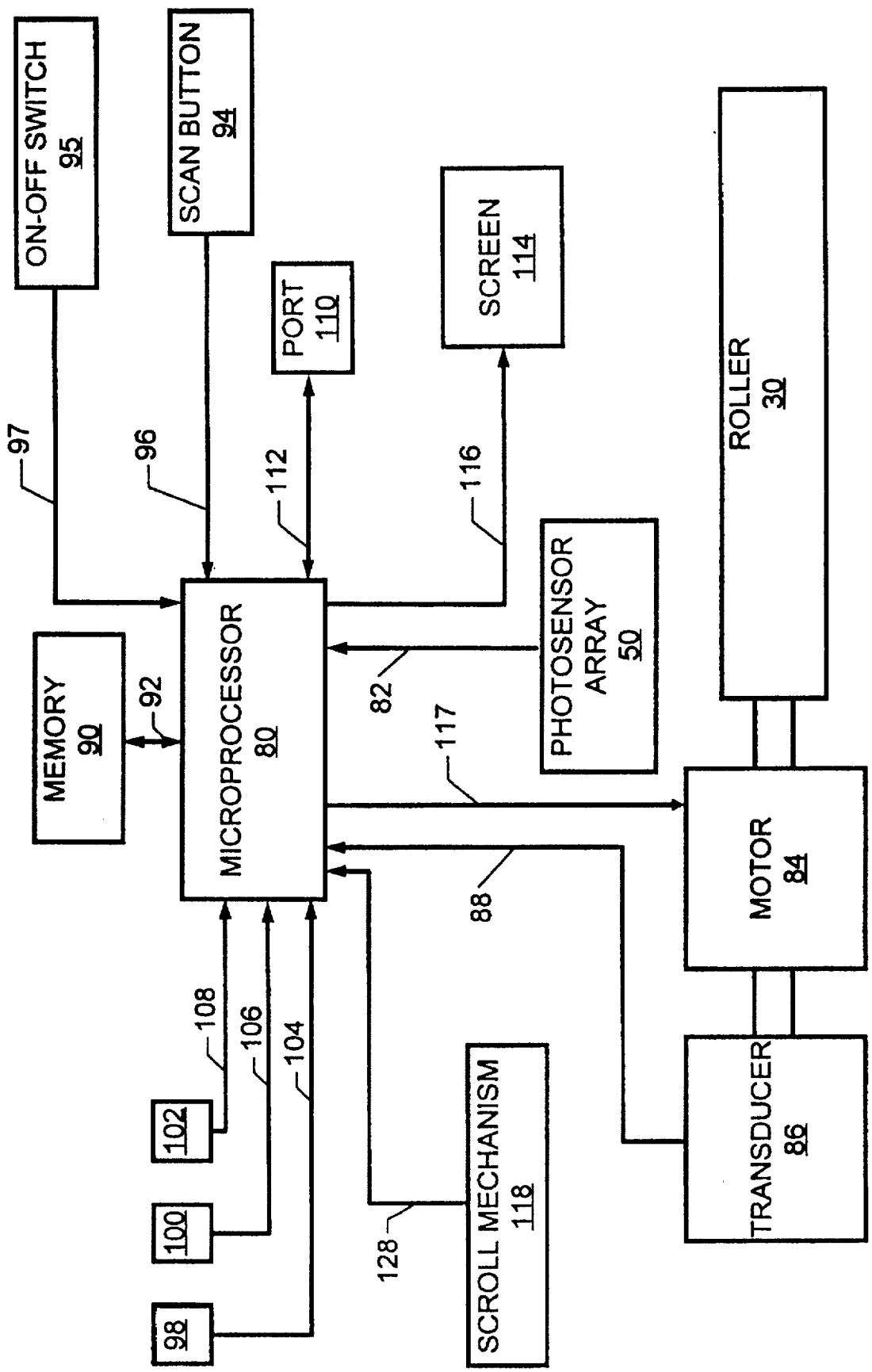
FIG. 5 is a schematic illustration showing the relationship between various functional components of the hand-held scanning device of FIG. 1.

Housing 20 also contains a memory storage device 90, FIG. 5. The memory storage device 90 is connected to microprocessor 80 by a connection 92. The memory storage device 90 serves to store images of scanned objects acquired by the hand-held scanning device 10. Memory storage device 90 may be a solid state memory device, capable of storing data equivalent to approximately fifty 8.5 inch by 11 inch pages of text. Memory storage device 90 may, alternatively be constructed as an integral part of microprocessor 80, rather than as a separate unit.

Figure 2:
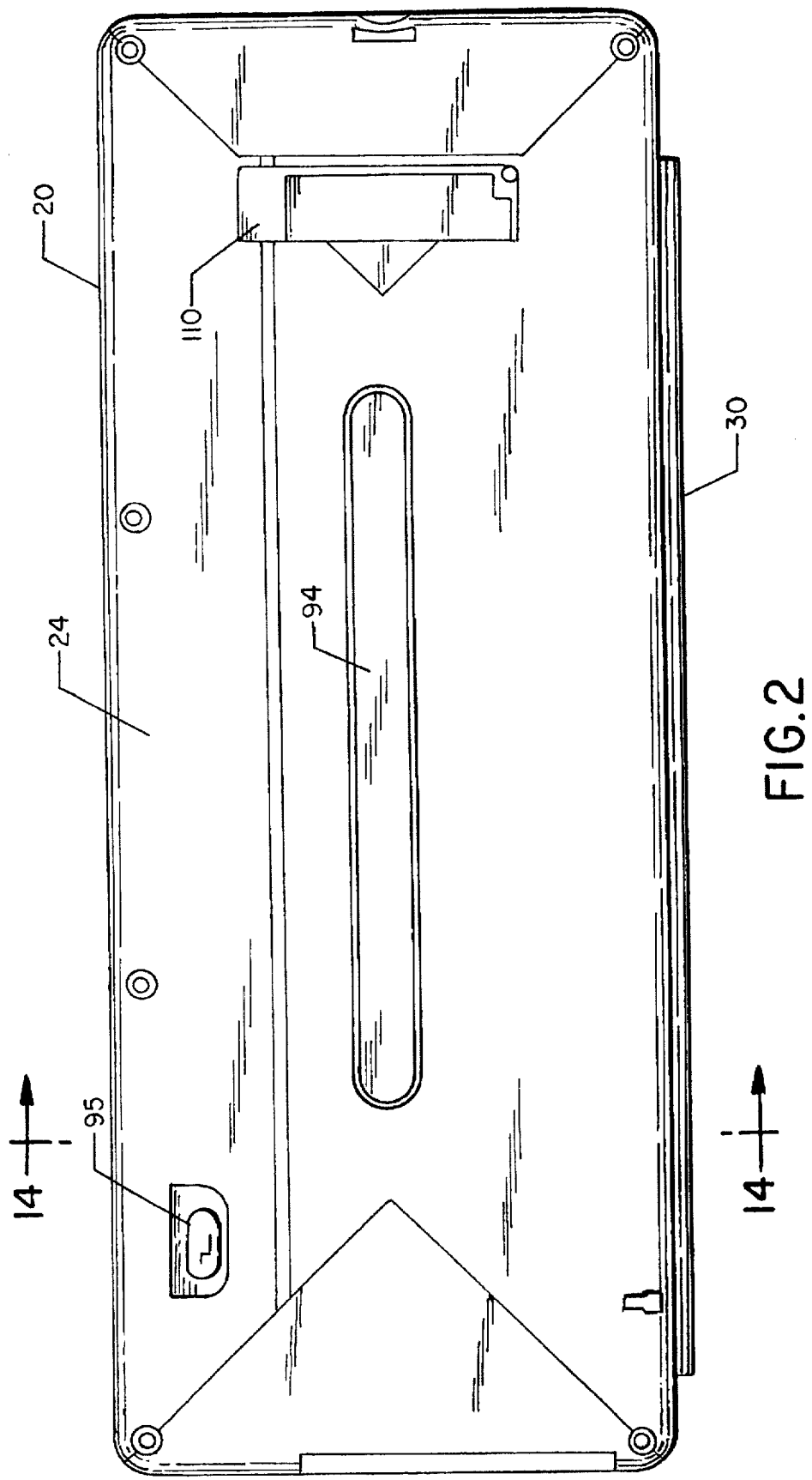
FIG. 2 is a rear elevation view of the hand-held scanning device of FIG. 1.

A scan button 94 is located on the rear surface 24 of housing 20, FIG. 2. Scan button 94 is connected to microprocessor 80 as illustrated by reference numeral 96 in FIG. 5. Scan button 94 is configured so as to be operable by a user when performing a scanning operation. Depressing scan button 94 causes microprocessor 80 to carry out a scanning operation.

An on-off switch 95 may be provided on the rear surface 24 of housing 20, FIG. 2. On-off switch 95 serves to power the hand-held optical scanning device 10 on and off in a conventional manner and may be connected to microprocessor 80 by a connection 97 as illustrated in FIG. 5.

Function buttons 98, 100, 102 may be located on the front surface 22 of housing 20 as shown in FIG. 1. The function buttons 98, 100, 102 allow a user of the hand-held scanning device 10 to communicate with the microprocessor 80 in order to accomplish such functions as a user interface for file management, image editing, etc. Function buttons 98, 100, 102 are connected to microprocessor 80 as indicated by reference numerals 104, 106, 108 respectively, FIG. 5.

An input-output port 110 is located on the rear surface 24 of housing 20, FIG. 2. Input/output port 110 is connected to microprocessor 80 as shown schematically by reference numeral 112 in FIG. 5. Input/output port 110 allows image data acquired by the hand-held scanning device 10 and/or stored by the microprocessor 80 and the memory storage device 90 to be transmitted or "downloaded" to a computer or other data-handling device. Input/output port 110 may be a physical connection device such as an industry standard "IEEE-1284" type connector or may be a non-contact connection apparatus such as an infrared communication port.

A screen 114, FIG. 1, may be provided on the front surface 22 of housing 20 for displaying images of objects that are being scanned and also for displaying images of previously scanned objects that are stored by microprocessor 80 and./or memory device 90. Screen 114 is connected to microprocessor 80 by connection 116, FIG. 5. Screen 114 may be used to display images that have been previously scanned and stored in microprocessor 80 and/or memory device 90. In this manner, the user of hand-held scanning device 10 can ensure that desired scan objects have been adequately captured before downloading the images to a computer or other data handling device.

Screen 114 may be also be used to display status information generated by the microprocessor 80. Additionally, screen 114 may be used to display menu information affording a user access to various scanning-related functions provided by the microprocessor 80.

Screen 114 may be a liquid crystal display (LCD) type screen of well known configuration. Such an LCD screen may be of the type commonly known in the industry as a reflective STN display. Screen 114 may have dimensions of approximately 2 inches by 2 inches.

A scroll mechanism 118 may be provided on the front surface 22 of housing 20, FIG. 1. Scroll mechanism 118 is provided with direction buttons 120, 122, 124 and 126 which may be activated by a user to scroll images displayed on the screen 114. Scroll mechanism 118 may also be used to move a curser or other pointer on the screen 114 to accomplish various functions as is well known. Scroll mechanism 118 is connected to microprocessor 80 by connection 128, FIG. 5.

To allow the hand-held scanning device 10 to be moved across an object 54 that is to be scanned, a roller 30 is provided on the bottom surface 28 of housing 20, FIGS. 1–3. The roller 30 may be rotatably mounted in the housing 20 by axle portions 32 and 34, FIG. 1. Mounted in this manner, the roller 30 is rotatable about the roller axis RR, FIGS. 4, 9 and 10. The roller axis RR intersects the imaging device central axis LL. Roller 30 may have a length "d" of, e.g., 8 inches and an outside diameter of, e.g., 0.5 inches. Roller 30 may be constructed having a metal core covered by an elastomeric coating.

Referring to FIG. 5, the roller 30 may be connected to a drive motor 84 which turns the roller 30 and thus drives the scanning device 10 along an object to be scanned 54 while a scan is being performed. A transducer 86 may be connected to the motor 84. Transducer 86 sends a signal 88 to microprocessor 80 which is indicative of the speed and displacement of the roller 30. In this manner, the microprocessor can determine the displacement of the hand-held scanning device 10 during a scanning operation in order to correlate data signal 82 from the photosensor array 50 to the proper location on the scanned object 54. Microprocessor 80 controls the activation and the speed of the motor 84 via a connection 117.

A battery, not shown, may also be provided within the housing 20 to provide power for the hand-held optical scanning device 10 in a conventional manner. The battery may be rechargeable as is well known. Alternatively, the scanning device 10 may be powered by an external power source via, e.g., a power cord.

Figure 6:
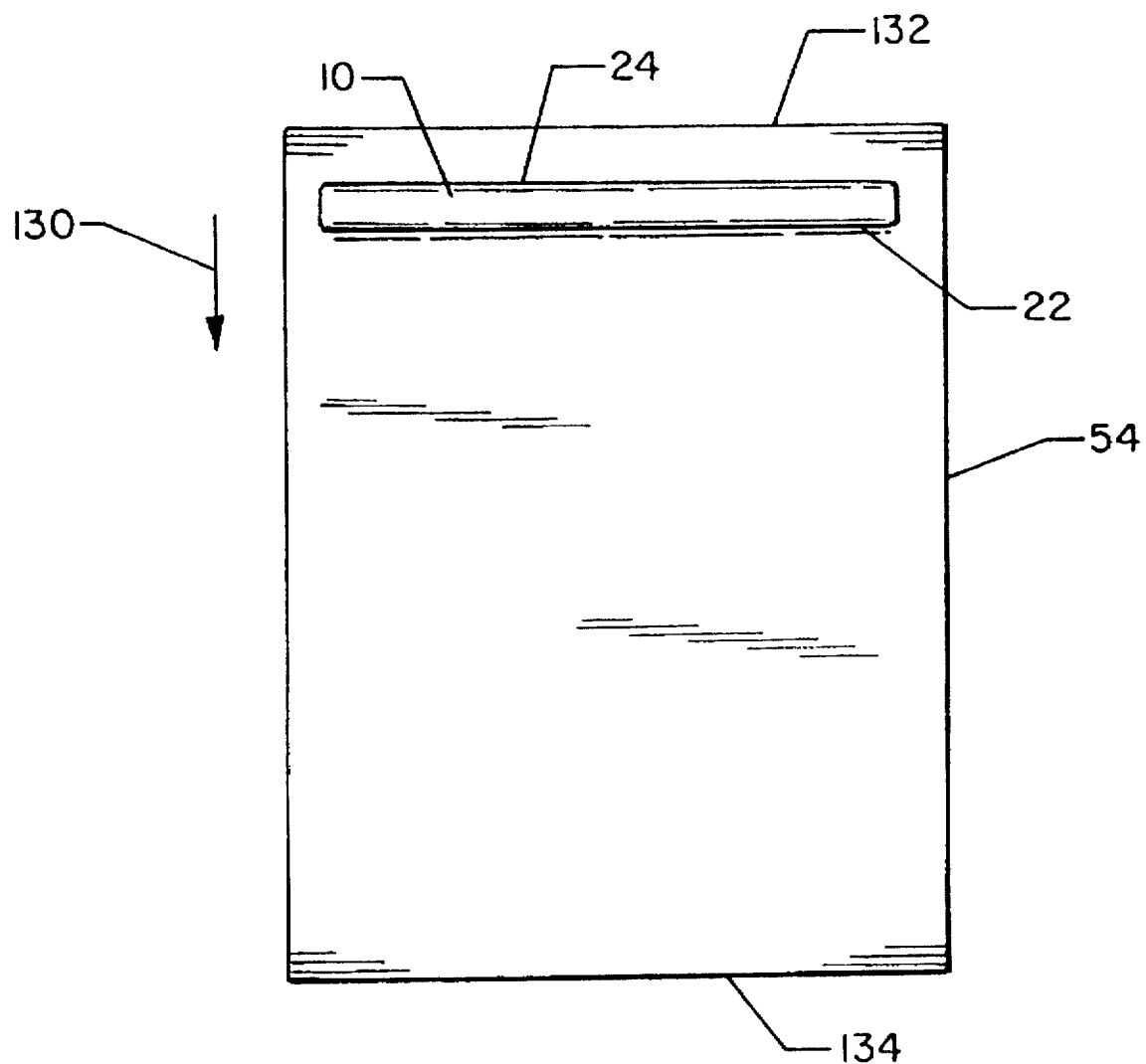
FIG. 6 is a schematic illustration showing the hand-held scanning device of FIGS. 1–5 being used to scan an object.

FIG. 6 shows the hand-held scanning device 10 positioned to begin a scan of an object 54 such as a document. Document 54 may be, for example an 8½ inch by 11 inch page of text. To scan the document 54, the scanning device 10 is first located at one end 132 of the document 54 with the roller 30 of the scanning device 10 resting on the document 54. The user then depresses scan button 94 and holds it down while the scanning device 10 moves across the document 54 in the scanning direction 130. As the scanning device is moved, imaging assembly 40 images line portions of the scanned object onto photosensor array 50 which, in turn, sends signal 82 indicative of the scanned line portions to the microprocessor 80. Photosensor array 50 transmits signal 82 representing line images of the object being scanned each time a sampling interval occurs as is well-known. A typical sampling interval may be, for example, 1/300th of an inch. When the scanning device 10 reaches the opposite end 134 of the document 54, the user may release the scan button 94 causing the scanning device 10 to halt its movement.

The hand-held scanning device 10 is configured so that contact with the object to be scanned 54 occurs only along a single line 53, FIG. 4. This line is transverse to the scanning direction 130, FIG. 6, and is defined by the roller 30, located on the bottom portion of the scanning device. The scanning device 10 is, thus, fully supported by the single roller 30 when performing a scan. Because the scanning device 10 is supported by only one roller, the imaging assembly 40 of the scanning device 10 may be moved very close to the edge of the object 54 while remaining fully supported. The hand-held scanning device 10 is able, therefore, to capture substantially all desired features of an object to be scanned (e.g., a page of printed text) while remaining fully supported.

The use of such a single roller configuration also allows a user to view the area being scanned by the hand-held scanning device 10 while a scan is being performed. Because the illumination light 64 is not hidden beneath the scanner structure, a user may view this light on the object 54 while the scan is being performed. This ability to view the illumination light 64 allows a user to determine what portion of the object 54 is being scanned by the scanning device 10. In this manner, the user can ensure that all desired features, e.g., text, on the object 54 are scanned.

Figure 7:
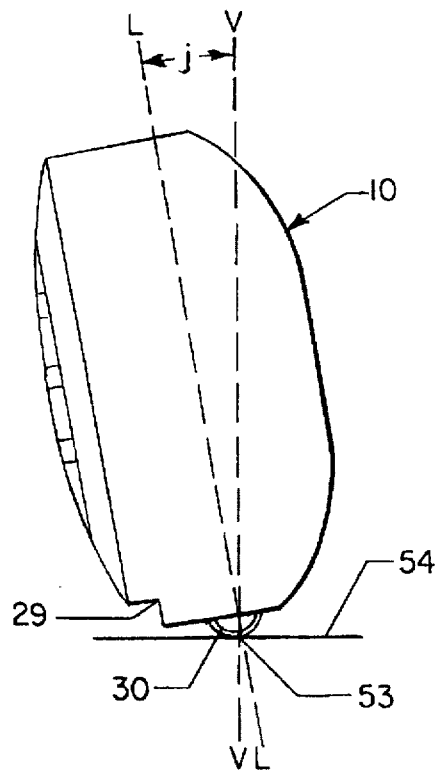
FIG. 7 is a side elevation view of the hand-held scanning device of FIG. 1 in a tilted forward position.
Figure 8:
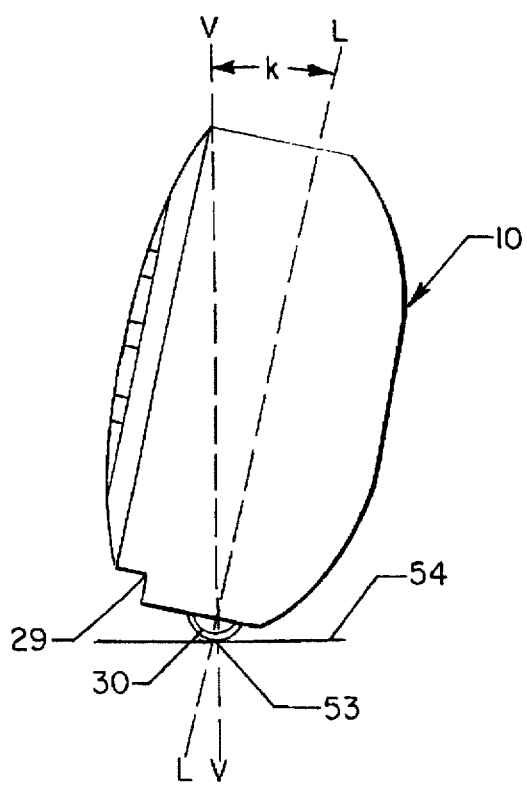
FIG. 8 is a side elevation view of the hand-held scanning device of FIG. 1 in a tilted rearward position.

To facilitate viewing of the illuminated scan area by a user, a notch 29 may be provided in the front and bottom surfaces 22, 28 of the hand-held scanning device. FIGS. 3, 7, 8. The notch 29 allows a user of the scanning device an unobstructed view of the area being scanned. Notch 29 may have a height "f" of, e.g., 0.22 inches, and a depth "g" of, e.g., 0.28 inches, FIG. 3.

Because the hand-held scanning device 10 is provided with only one roller, a user may inadvertently tilt the scanning device forward and backward while a scan is being performed. Referring to FIGS. 7 and 8, a normal plane VV is defined by the roller axis RR and the contact line 53 between the roller 30 and the object 54. In the case of a planar object, e.g., the object 54 shown in FIGS. 7 and 8, the normal plane VV will always be perpendicular, or normal, to the plane of the object. Often, however, objects to be scanned are not planar. One example of such a non-planar object is an open book, in which the page to be scanned might assume a curved profile.

Figure 11:
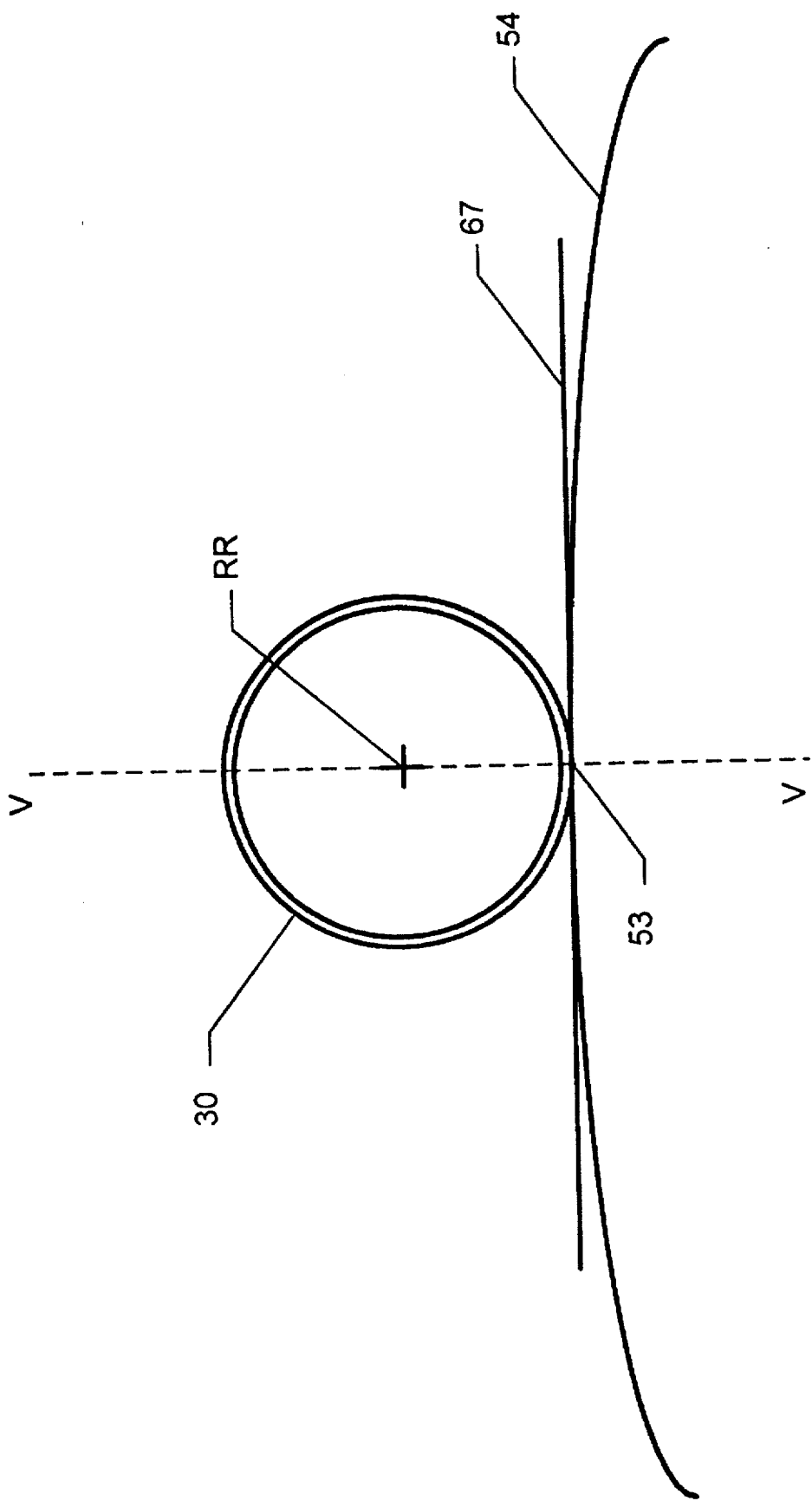
FIG. 11 is a schematic illustration of the hand-held scanning device of FIG. 1 scanning a curved surface of an object.

FIG. 11 schematically illustrates an example of an object 54 having a non-planar profile. In such a case, the normal plane VV is still defined by the roller axis RR and the contact line 53 as shown. The normal plane VV is also perpendicular to a tangent plane 67 which is parallel to the tangent of the outer surface of roller 30 at the contact point 53. In the case of a planar object 54 as shown in FIGS. 7 and 8, the tangent plane 67 will be coincident with the plane of the object 54.

Figure 9:
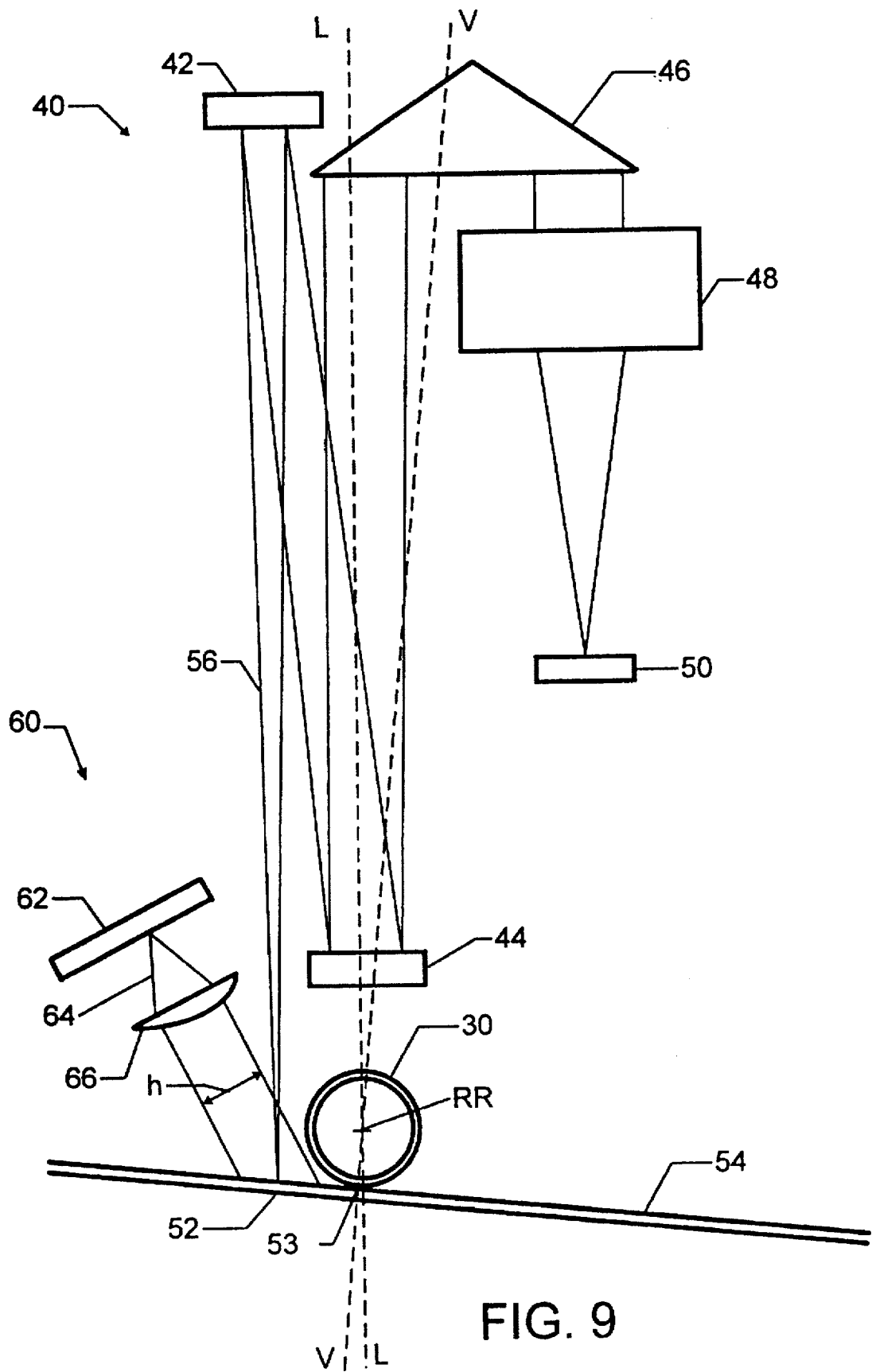
FIG. 9 is a schematic side elevation view of the optical system of the hand-held scanning device of FIG. 1 in a tilted forward position.
Figure 10:
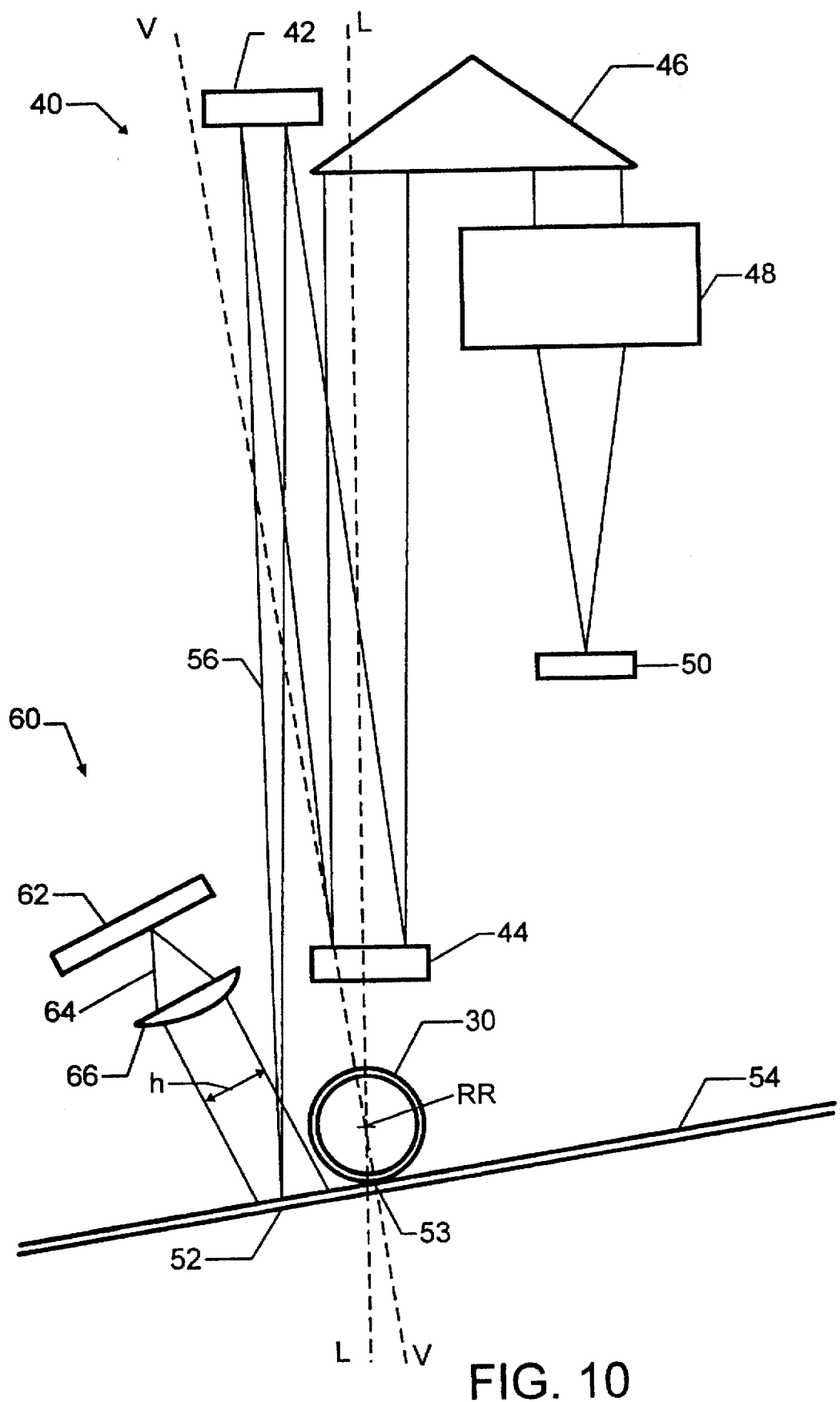
FIG. 10 is a schematic side elevation view of the optical system of the hand-held scanning device of FIG. 1 in a tilted rearward position.

FIG. 7 shows the hand-held scanning device 10 in a tilted forward configuration in which the axis LL of the scanning device 10 is inclined "j" degrees forwardly of the normal plane VV. FIG. 8 shows the hand-held scanning device 10 in a tilted backward configuration in which the axis LL of the scanning device is inclined "k" degrees rearwardly of the normal plane W. FIGS. 9 and 10 schematically illustrate the effect of forward and rearward tilting, respectively, on the imaging assembly 40. FIG. 4 schematically illustrates the imaging assembly 40 when the hand-held scanning device 10 is in a non-tilted configuration in which the axis LL of the scanning device lies within the normal plane VV.

It has been determined that a typical user is easily able to perform a scan with the hand-held scanning device 10 without tilting the device more than an angle "j" of 10 degrees forwardly or more than an angle "k" of 10 degrees rearwardly of the normal plane VV. Accordingly, the scanning device is designed to accommodate such tilting during a scanning operation without significant degradation of acquired image quality as will now be explained in detail.

The scanning device 10 is constructed to ensure that no portion of the housing 20 will contact the scanned object 54 when the device is tilted up to 10 degrees from the normal plane VV in either direction. To accomplish this, the roller 30 is configured to protrude a sufficient distance beneath the bottom surface 28 of the housing 20, FIG. 3. It has been found, for example, that locating the outer circumference of the roller 30 a distance "e" of at least about 0.125 inches below the bottom surface 28 of housing 20 is sufficient for this purpose.

As can be seen from FIG. 9, when the scanning device 10 is tilted forward (i.e., in the scanning direction 130), the effective distance between the lens 48 and the line portion 52 on document 54 becomes shorter. Conversely, as can be seen from FIG. 10, when the scanning device 10 is tilted backward (i.e., opposite to the scanning direction 130), the effective distance between the lens 48 and the line portion 52 on document 54 becomes longer. Accordingly, the line portion 52 tends to move out of the focus of lens 48 as the scanning device 10 is tilted.

To solve this problem, the scanning device 10 may be provided with a lens 48 having a relatively high f-number. As is well-known, a lens with a higher f-number will have a greater depth of field than a lens with a lower f-number. Accordingly, the use of a higher f-number lens enables the hand-held scanning device 10 to keep the line image 52 adequately in focus throughout the tilting movements described above. It has been found that a lens having an f-number of at least about 4 and a depth of field of at least about 0.20 inches is sufficient to keep the line portion 52 in adequate focus throughout tilting movements of up to about 10 degrees from the normal plane VV. Preferably, the lens 48 has an f-number of about 4 and a depth of field of about 0.20 inches. Because a higher f-number lens tends to capture less light, a more sensitive photosensor array 50 may be used in the scanning device 10. In one example, a photosensor array having a signal to noise ratio of about 60:1 may be used.

To further minimize the adverse effects of tilt on acquired image quality, the hand-held scanning device 10 is configured so as to minimize the distance "i" between the roller contact line 53 and the line portion 52, FIG. 4. As best illustrated in FIGS. 9 and 10, when the scanning device 10 is tilted, as described above, it rotates about the roller rotation axis RR. Accordingly, the longer the distance "i", the greater will be the defocusing relative movement between the line portion 52 of the object to be scanned 54 and the photosensor array 50. Conversely, minimizing the distance "i", reduces this defocusing effect. It has been found that maintaining the distance "i" at about 0.30 inches or less serves to adequately minimize the de-focusing effect.

Another problem caused by the tilting described above is that the line image tends to move out of the illumination light 64 as the scanning device is tilted. As illustrated in FIG. 9, when the scanning device 10 is tilted forwardly, the line portion 52 moves closer to the contact line 53 between the roller 30 and the object 54. Conversely, as illustrated in FIG. 10, when the scanning device 10 is tilted rearwardly, the line portion 52 moves further away from the contact line 53. Thus, if a conventional relatively narrow-width illumination light were used in the hand-held scanning device 10, the line portion 52 would move out of the lit area when tilted. This would result in degradation of the image acquired by the scanning device 10 since illumination of the line portion 52 is necessary for optimum acquired image quality.

To ensure adequate illumination of the line portion 52 while tilting, the scanning device 10 may be provided with a relatively wide illumination light beam 64 as shown in FIGS. 4, 9 and 10. The width of this light beam is determined by the configuration of the lens 66. In this manner, a wider area on object 54 is illuminated and the line portion 52 remains illuminated even when the scanning device 10 is being tilted forwardly as shown in FIG. 9 and rearwardly as shown in FIG. 10. It has been found that providing an illumination light having a width "h" of about 0.160 inches is sufficient to compensate for a scanning device tilt of up to about 10 degrees from the normal plane VV.

A further problem caused by the tilting of hand-held scanning device 10 is that the magnification of the line portion 52 is affected. When the scanning device 10 is tilted, the object 54 is no longer perpendicular to the image beam 56, as best illustrated in FIGS. 9 and 10. Accordingly, portions of the line portion 52 will be closer to the photosensor array 50 than will other portions. This results in the closer portions being magnified to a lesser extent than the further portions and the image of the closer portions focused on photosensor array 50 being smaller than the image of the further portions, thus resulting in some degradation of the quality of the image acquired by the scanning device 10.

It has been found, however, that the image degradation associated with magnification is relatively negligible and need not be corrected when the scanning device 10 is tilted not more than about 10 degrees from the normal plane VV during use. If, however, it is desired to enhance acquired image quality or to compensate for tilting of the scanning device 10 greater than 10 degrees from the normal plane VV, then a type of lens known as a "telecentric lens" may be used in place of the lens 48 previously described. Telecentric lenses are commonly used in the photolithographic industry and are configured to eliminate the variations in magnification caused by distance variation due to tilting, as described above, in a well-known manner.

Although the hand-held scanning device 10 has been described having a single roller 30, it is to be understood that a multi-part roller could alternatively be provided in which the axes of rotation of the roller parts are colinear. Such a configuration would provide for line contact between the scanning device and the object being scanned as described above.

As a further alternative, the roller 30 previously described could be replaced with a slide mechanism which allows sliding, rather than rolling, movement of the scanning device 10 across the object to be scanned 54 and which also provides for substantially line contact between the scanning device and the object to be scanned.

Figure 12:
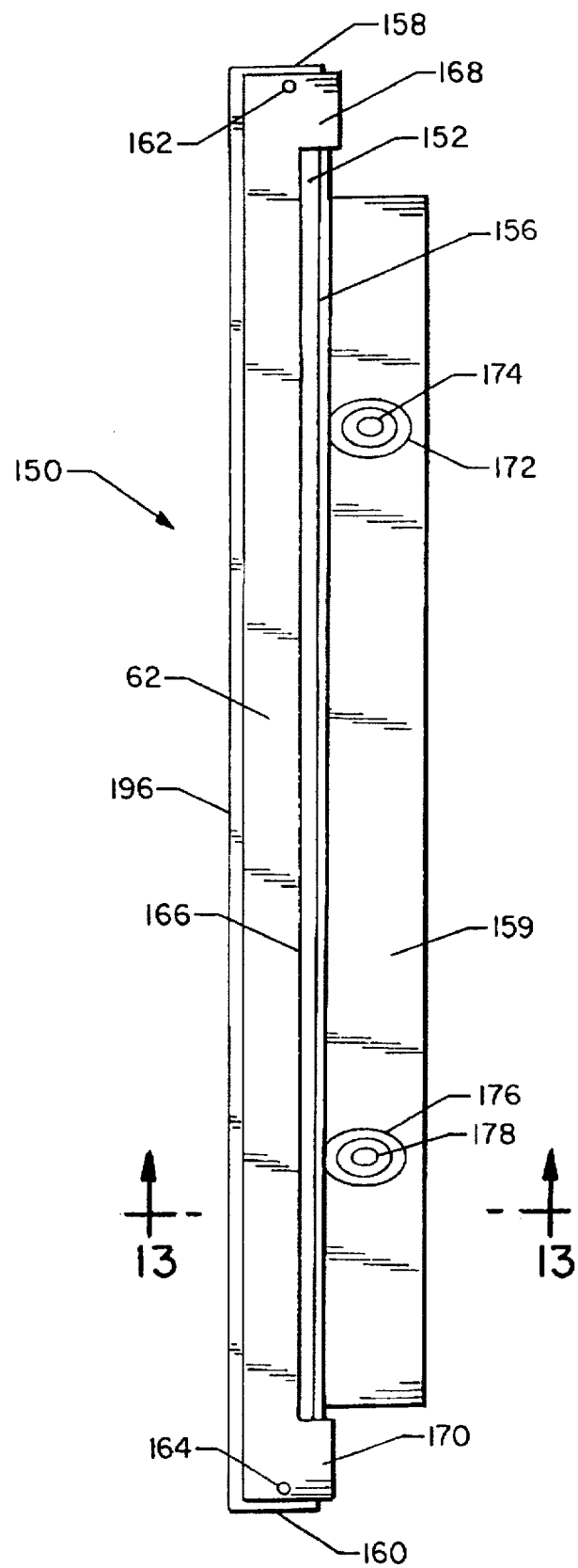
FIG. 12 is a top plan view of a window assembly for the hand-held scanning device of FIG. 1.
Figure 13:
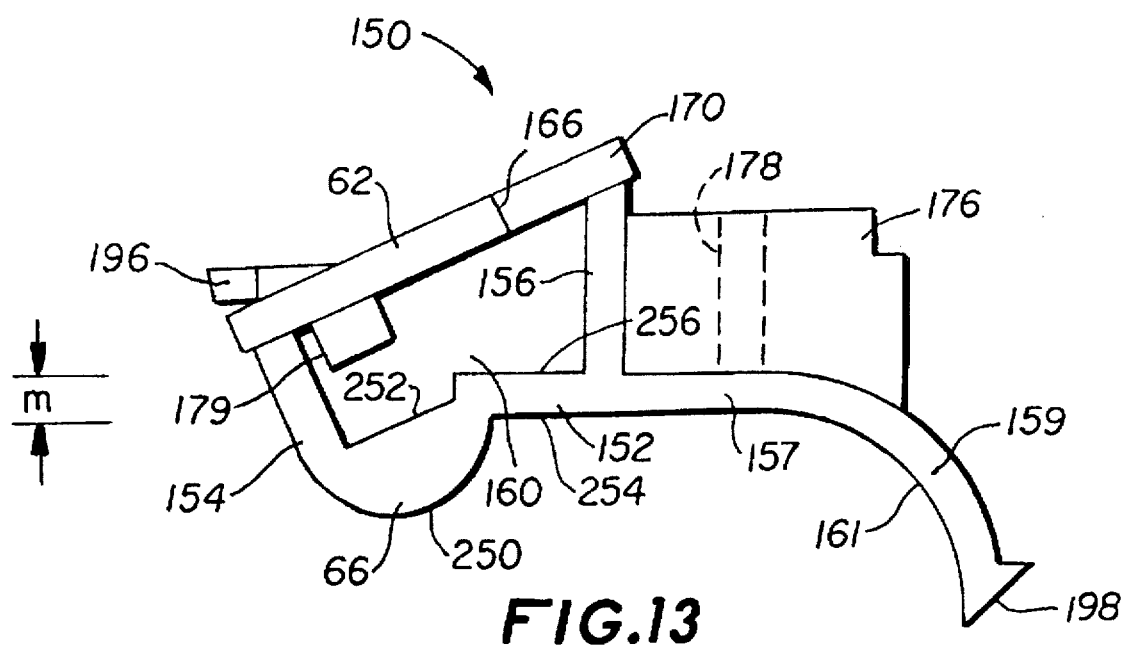
FIG. 13 is a cross-section view of the window assembly of FIG. 12 taken along the line 13—13 in FIG. 12.
Figure 14:
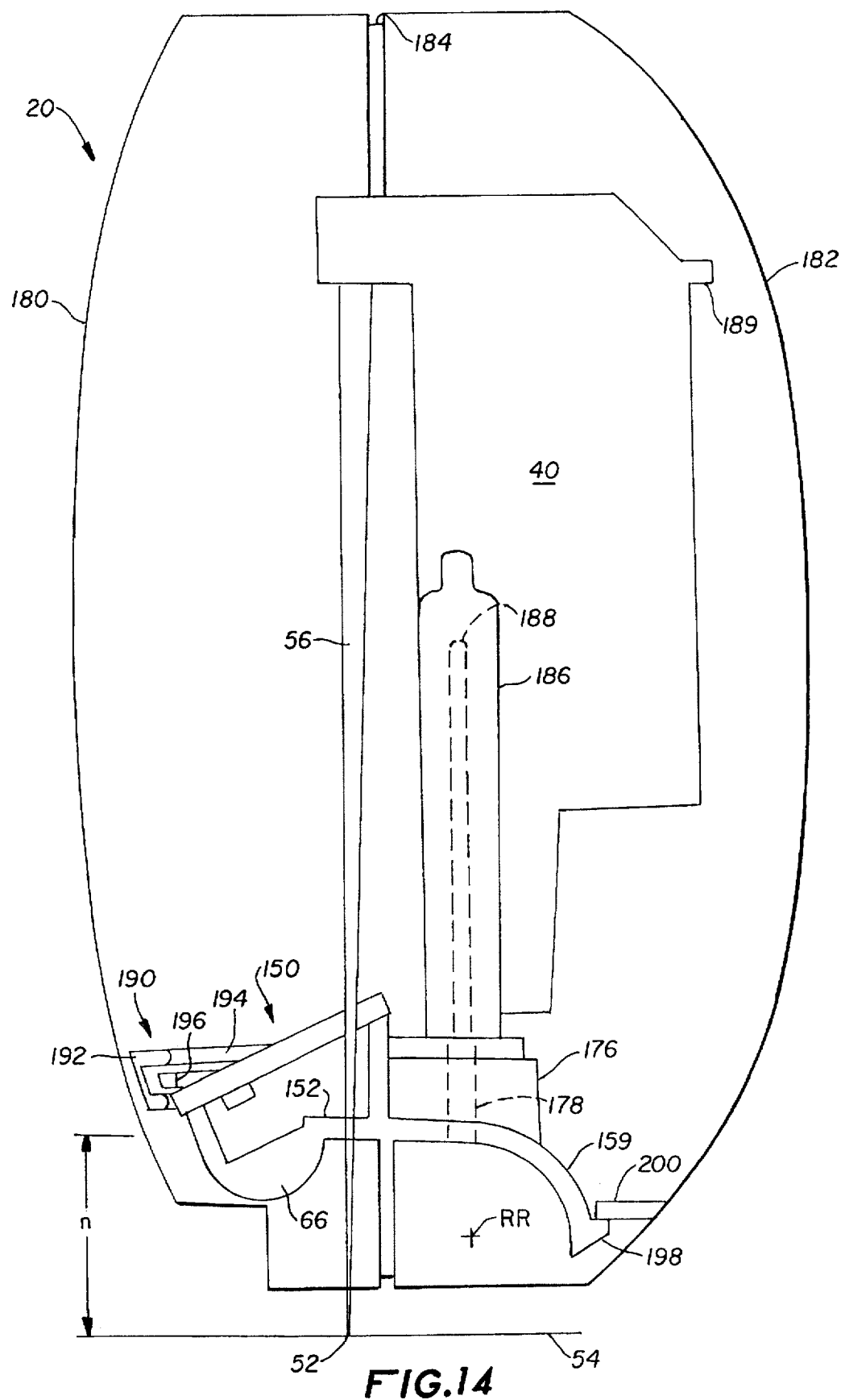
FIG. 14 is a cross-section view of the hand-held scanning device of FIG. 1 showing the mounting of the window assembly of FIG. 12, taken along the line 14—14 of FIG. 2.

FIGS. 12 through 14 illustrate a window assembly 150 which may be used to seal the scanning device housing 20 and, thus, prevent dust, moisture and other potential contaminants from entering the interior of the housing 20 and contaminating the: optical components of the imaging assembly 40, FIGS. 4, 9 and 10, and associated scanning device electronics.

Referring to FIGS. 12 and 13, window assembly 150 may be integrally constructed to include both the light source lens 66, as previously described, and a transparent window portion 152. Transparent window portion 152 allows unobstructed passage of the imaging beam 56 from the line image 52 to the imaging system 40, as best shown in FIG. 14, while effectively sealing the scanning device housing 20 to prevent the entry of dust, moisture, and other contaminants.

Window assembly 150 may include a front wall portion 154, FIG. 13. The lens 66 may be located immediately adjacent the front wall portion 154 and may include a first curved surface 250 and a second substantially flat surface 252 which may be substantially perpendicular to the front wall portion 154. Window portion 152 may be located immediately adjacent lens 66 and may include substantially parallel first and second surfaces 254, 256. Located immediately adjacent window portion 152 is rear wall portion 156 which may extend substantially perpendicular to the window portion 152. Side wall portions 158, 160 may extend between the front wall portion 154, lens 66, window portion 152 and rear wall portion 156, FIGS. 12 and 13. A linear wall portion 157 may extend rearwardly from the juncture of the window portion 152 and the rear wall 156 as shown in FIG. 13. Linear wall portion 157 may transition into a curved wall portion 159 as shown in FIG. 13. Mounting blocks 172, 176 may be located immediately adjacent the rear wall 156, linear wall portion 157 and the curved wall portion 159 in the locations shown, e.g., in FIG. 12. The window assembly front wall portion 154, lens 66, window portion 152, rear wall portion 156, linear wall portion 157, curved wall portion 159 and the mounting blocks 172, 176 as described above may all be integrally formed.

The LED board 62, as previously described, may also be configured as an integral part of the window assembly 150. LED board 62 may be supported by window assembly 150 front and rear wall portions 154, 156, FIG. 13, and side wall portions 158, 160, FIG. 12. As best shown in FIG. 12, the LED board 62 may be secured to the remainder of the window assembly 150 by screws 162, 164 which may engage threaded openings, not shown, in the sidewall portions 158, 160 in a conventional manner. Alternatively, the LED board could be secured by gluing or by any other appropriate mechanism. LED board 62 contains a light source 179, FIG. 13, which, when the LED board is mounted as described above, aligns with the lens 66. When attached to the window assembly 150 as described above, the LED board 62 is substantially parallel to the lens surface 252 as shown in FIG. 13.

Attaching the LED board directly to the window assembly 150 in this manner reduces the likelihood of any misalignment between the light source 179 and the lens 66. Such misalignment could result in undesirable distortion of the illumination light beam 64. Also, since the lens 66 is formed in the window assembly 150, it is located at the outermost portion of the scanning device housing 20. Accordingly, there are no additional optical components through which illumination light beam 64 must pass before reaching the object 54. As can be appreciated, the integrally formed lens 66 described above serves two functions; to focus the illumination light beam 64 on the object 54 and to close the housing 20 against the ingress of dust and other contaminants.

In order to allow unobstructed passage of the image beam 56, LED board 62 may be provided with a notch 166 defined by rearwardly extending leg portions 168, 170, FIG. 12. The leg portions 168, 170 facilitate secure attachment of the LEE, board 62 to the remainder of the window assembly 150 by providing engagement with the window assembly rear wall 156.

Curved wall 159 serves to distance the window portion 152 and lens 66 of the window assembly from the object being scanned 54, as will be explained in further detail. The curved inner surface 161 of the wall 159 provides clearance for the roller 30 (which has been removed from FIG. 14 for clarity) when the window assembly 150 is mounted in the scanning device housing 120.

Mounting blocks 172, 176 are provided with through-holes 174 and 178, respectively to facilitate attachment of the window assembly 150 to the scanning device optical assembly 40 as will be explained in further detail.

Referring to FIG. 14, it can be seen that the window assembly 150 closes the bottom part of the housing 20 while allowing unobstructed passage of image beam 56 through the window portion 152 and of light 64, FIG. 10, through the lens 66. In order to avoid relative movement between the window assembly 150 and the imaging assembly 40, the window assembly may be attached directly to the imaging assembly while being allowed to "float" with respect to the housing 20 as will be described in further detail. For proper operation of the hand-held scanning device 10, it is important that the window assembly 150 not move relatively to the imaging assembly 40. Such relative movement could, for example, cause distortion of the imaging beam 56 as it passes through the window portion or physical interference with the imaging beam by portions of the window assembly 150.

The optical assembly 40 may be provided with a plurality of mounting blocks, such as the mounting block 186 shown in FIG. 14. Mounting block 186 may have an opening 188 therein which may be threaded. Accordingly, window assembly 150 may be securely attached to optical assembly 40 by passing a bolt or screw, not shown, through the through-hole 178 in the window assembly mounting block 176 and threading it into the opening 188 of the optical assembly mounting block 186. A similar mounting process may be used with respect to the window assembly mounting block 172, FIG. 12.

In the manner described above, the window assembly 150 may be rigidly attached to the optical assembly 40. Housing 20 may be formed of a front housing portion 180 and a rear housing portion 182 which may be joined at a joint area 184. The front and rear housing portions 180, 182 may be held together by screws, not shown, or by any conventional mechanism. The optical assembly 40 may be attached to the rear housing portion 182. Threaded mounting blocks, such as the threaded mounting block 189, FIG. 14, may be provided on the exterior of optical assembly 40 to facilitate such attachment in a conventional manner.

During use and during transport of the hand-held scanning device 10, the housing 20 is often subjected to physical stresses. One example of a cause of such physical stress is when a user of the scanning device 10 squeezes the housing 20 while performing a scan. Since the housing 20 may be formed of plastic, which is relatively flexible, these stresses may cause relative movement to occur between various portions of the housing and, particularly, between the front housing portion 180 and the rear housing portion 182.

Because the optical assembly 40 is attached to the rear housing portion 182 and the window assembly 150 is rigidly attached to the optical assembly, relative movement may occur between the window assembly 150 and the front housing portion 180 due to the stresses described above. Accordingly, in order to effectively seal the housing 20 against entry of dust and other contaminants while accommodating this relative movement, the window assembly 150 may be designed to "float" with respect to the front housing portion 180 as will now be described in detail.

A seal mechanism 190 may be provided on the inside of front housing portion 180 as shown in FIG. 14. Seal mechanism 190 is generally U-shaped in cross-section and has a first length 192 extending along the front of the housing portion 180, a second length 194 extending along the right side of housing portion 180 and a third length, not shown, extending along the left side of housing portion 180. Window assembly 150 may be provided with an edge member 196, FIGS. 12–14, which, when the scanning device 10 is assembled, is positioned between the legs of the U-shaped seal mechanism 190 as shown in FIG.

As can be seen from FIG. 14, a clearance is provided between the window assembly edge member 196 and the front housing portion seal mechanism 190. This clearance allows the front housing portion 180 to move relative to the window assembly 150 and, thus, prevents movement of the front housing portion 180 from causing relative movement between the window assembly 150 and the optical assembly 40.

Although allowing relative movement, the cooperating shapes of the window assembly edge member 196 and the front housing portion U-shaped seal mechanism 190 provide a tortuous path which effectively limits the amount of dust and other contaminants entering the housing 20.

The window assembly 150 may contain a lip member 198 located at the rear of the curved wall 159, FIGS. 13 and 14. This lip member cooperates with a rib 200, FIG. 14, which may be integrally formed with the rear housing portion 182 in order to seal the rear portion of the window assembly to the housing 20. Similar features, not shown, may be provided to seal the sides of the window assembly curved wall 159 to the sides of the rear housing portion 182.

As previously mentioned, the curved wall 159 of window assembly 150 causes both the window portion 152 and the lens 66 to be spaced from the object 54. Because the window portion 152 and lens 66 do not ride directly on the object 54, they are much less likely to be scratched or otherwise damaged during normal operation of the hand-held scanning device 10. Such scratching may result, for example, when a scanning device having an object-contacting window is moved across an object which is dirty or gritty or when a staple is encountered. A scratched or otherwise damaged window may distort the image beam 56 passing through the window and thus result in degradation of the quality of the image acquired by the hand-held scanning device 10. Similarly, a scratched or otherwise damaged light source lens may distort the light beam 64 passing through the lens and result in impairment of the light supplied by the light source 62 and, thus, also result in degradation of the image acquired by the hand-held scanning device 10. Image quality may also be adversely affected by a window which contains flaws not caused by contact with the object. Such flaws may be more prevalent in less expensive window materials.

The window portion 152, located as shown in FIG. 14, is removed from the focal area of the imaging assembly 40. Since optical systems of scanning devices must be focused on the object being scanned in order to maximize acquired image quality, locating the window adjacent the object, as in conventional scanning devices, necessarily places the window in the focal area of the optical system. Accordingly, any defects or flaws, such as scratches, on the window will be imaged on the photosensor array and thus will more significantly degrade the quality of the acquired image.

Window portion 152 may be located a distance "n" of at least about 0.30 inches above the object 54, FIG. 14 (when the hand-held scanning device 10 is not tilting). It has been found that this distance is sufficient to maintain the window 156 out of contact with the object during scanning operations and to adequately remove the window portion 152 from the focus area of the imaging system 40 when a lens having an f-number of about 4 and a depth of field of about 0.20 inches is provided. Most preferably, the window portion 152 may be located a distance "n" of about 0.55 inches above the object 54.

Window assembly 150 may be constructed of acrylic and be configured to contain both the window portion 152 and the lens 66 integrally formed therein. Window portion 152 may have a thickness "m" of about 0.080 inches, FIG. 13, and be formed of the same material as the remainder of the window assembly 150. Alternatively, window portion 152 may be a separate piece constructed of, e.g., glass and attached to window assembly 150 via, e.g., gluing.

In this manner, the window assembly 150 may be securely fastened to the scanning device housing 20 in a configuration which locates the window portion 152 out of the focus of the scanning device imaging system 40 and which prevents contact between the window portion 152 and the object being scanned. The window assembly 150 prevents entry of contaminants into the housing 20 while allowing unobstructed passage of the light beam 56 into the housing interior and may also support the LED board 62 thereon.

It will be appreciated that, although described with respect to a single roller hand-held scanning device, the above described window design could be used with any type of scanning device.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of scanning an object with a hand-held optical scanning device comprising the steps of:
   making contact between said object and said scanning device;
   performing a scan while moving said scanning device along said object and maintaining said contact;
   variably tilting said scanning device while performing said scan;
   imaging successive line portions of said object with a light path as said scanning device is moved along said object;
   wherein the greater part of said light path extends in an orientation which is substantially perpendicular to the orientation of said object.

2. The method of claim 1 wherein said object is substantially planar and said tilting occurs about an axis extending substantially parallel to the plane of said object.

3. The method of claim 1 wherein said optical scanning device has at least one roller having an axis of rotation and said contact is made by contacting said at least one roller with said object.

4. The method of claim 3 wherein said roller contacts said object along a contact line which is parallel to said axis of rotation.

5. The method of claim 4 wherein said contact line and said axis of rotation define a normal plane, said scanning device has a central axis and said step of tilting includes angling said central axis relative said normal plane.

6. The method of claim 5 wherein said central axis intersects said axis of rotation.

7. The method of claim 3 wherein said step of tilting includes tilting said optical scanning device about said axis of rotation.

8. The method of claim 7 wherein said object is substantially planar and said tilting occurs about an axis extending substantially parallel to the plane of said object.

9. The method of claim 1 wherein said contact is made only at substantially colinear points.

10. The method of claim 1 including the further steps of:
    providing a display screen on said hand-held optical scanning device; and
    viewing on said display screen images produced from data representative of said successive line portions.

11. The method of claim 1 including the further step of viewing said successive line portions while said scan is being performed.

12. The method of claim 10 wherein said viewing is carried out subsequent to completion of said scan.

13. The method of claim 10 wherein said viewing is carried out while said scan is being performed.

14. A hand-held optical scanning device for imaging a scanned object comprising:
    a) a housing containing an imaging assembly;
    b) said housing being tiltable relative said object while a scan is being performed with said scanning device;
    c) wherein said scanning device images a line portion of said object during said imaging;
    d) said imaging assembly comprises a photosensor device and a light path extending between said line portion and said photosensor device; and
    e) the greater part of the length of said light path extends in an orientation which is substantially perpendicular to the orientation of said object at said line portion.

15. The apparatus of claim 14 wherein:
    a) said housing has a first dimension measured in an orientation which is perpendicular to the orientation of said object at said line portion;
    b) said housing has a second dimension measured in an orientation which is perpendicular to said first dimension; and
    c) said first dimension is at least about 2 times said second dimension.

16. The apparatus of claim 14 wherein said object is substantially planar and said housing is tiltable about an axis extending substantially parallel to the plane of said object.

17. The apparatus of claim 14 further comprising:
   a) a contact mechanism associated with said housing;
   b) said contact mechanism comprising a plurality of substantially colinear contact points configured so as to provide the sole contact with said scanned object.

18. The apparatus of claim 17 wherein said contact mechanism comprises at least one roller rotatably connected to said housing.

19. The apparatus of claim 14 further including at least one roller rotatably attached to said housing at a roller axis of rotation.

20. The apparatus of claim 19 wherein said housing is tiltable relative said object about said roller axis of rotation.

21. The apparatus of claim 20 wherein said object is substantially planar and said housing is tiltable in a plane substantially perpendicular to the plane of said object.

22. The apparatus of claim 14 wherein said imaging assembly includes a lens having an f-number of at least about 4.

23. The apparatus of claim 14 wherein said scanning device images successive line portions of said object to accomplish said imaging, and wherein said housing is configured to allow a line of sight between said line portions and a user of said scanning device while said imaging is taking place.

24. The apparatus of claim 23 further comprising a notch located in said housing along said line of sight.

25. The apparatus of claim 18 wherein said hand-held optical scanning device images a line portion of said object during said imaging and said roller contacts said object substantially along a contact line and wherein the distance between said contact line and said line portion is equal to or less than about 0.30 inches.

26. The apparatus of claim 14 wherein at least 80% of said length of said light path extends substantially in an orientation which is perpendicular to the orientation of said object at said line portion.

* * * * *